J. Ingels,

Seed Dropper.

No. 102,405. Patented Apr. 26, 1870.

Witnesses.
J. D. Patten.
Edmund Masson.

Joseph Ingels.
By atty. A. B. Stoughton.

N. PETERS, PHOTO-LITHOGRAPHER, WASHINGTON, D. C.

United States Patent Office.

JOSEPH INGELS, OF MILTON, INDIANA.

Letters Patent No. 102,405, dated April 26, 1870.

IMPROVEMENT IN SEEDING-MACHINES.

The Schedule referred to in these Letters Patent and making part of the same.

*To all whom it may concern:*

Be it known that I, JOSEPH INGELS, of Milton, in the county of Wayne and State of Indiana, have invented certain new and useful Improvements in Feeders and Receivers for Grain-Drilling or Seeding-Machines; and I do hereby declare the following to be a full, clear, and exact description of the construction and operation of the same, reference being had to the accompanying drawings making a part of this specification, in which—

Similar letters of reference, where they occur in the separate figures, denote like parts of the device in all of the drawings.

This invention relates to the construction of the feeding-hopper and feeding-wheel, and their joint operation, one with the other, for receiving and distributing in measured quantities the grain to be sown.

And it further relates to the manner of hinging the receiver to the seed-hopper, so that it may freely oscillate thereon, and about a center, of which the seed-wheel shaft is the axis.

And it further relates to the manner of suspending the stirrups upon a square shaft, so that said shaft may freely turn without turning the stirrups with it.

To enable others skilled in the art to make and use my invention, I will proceed to describe the same, with reference to the drawings.

In the bottom A of the seed-box of a grain-drilling or planting-machine, are bored a series of round holes, B, (one only being shown, but the whole series being alike,) to the under margin of which is attached the concave C, the upper part of said concave being round, so as to completely encircle the round hole to which it is attached, and below the round portion tapering and changing into a conoidal cup, or shell form, in which the grain from the seed-box or hopper falls. This concave in its interior, when the seed-wheel D is in place in it, may be said to be divided into two chambers or apartments, viz: the closed chamber, which is in front of the axis or hubs of the seed-wheel, and the open chamber which is aft of said seed-wheel.

The partition or division between these two compartments is formed partially by the flanges *a* cast upon the cheeks or sides of the concave toward the top, the flanges or projections *b* near the bottom, and the abutments or cut-offs *c* midway between them, and finally the seed-wheel D, which occupies the intervening space, and takes from the close chamber the portions or charges of grain, and, carrying it past the partition, delivers it into the receiver E, whence it passes through a rubber, or other tube, F, to the ground.

The seed-wheel D, in each concave C, has a series of buckets or ribs, *d*, on its perimeter, which extends laterally far enough to leave room for the hubs *e e* between the sides or ends of said wheel and the sides or cheeks of the concave.

The shaft G, upon which the series of wheels are placed, and with which they revolve, is passed through suitable openings in the concave C, and through the hubs of the wheels D placed in said concaves.

Figure 1:
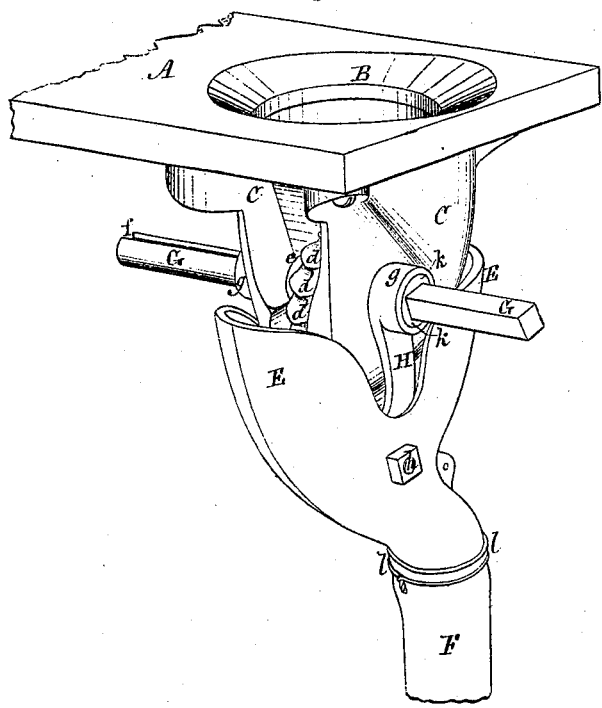
Figure 1 represents in perspective a portion of the grain-board, with one of the feeders and receivers attached thereto, which will readily illustrate the series as used.
Figure 2:
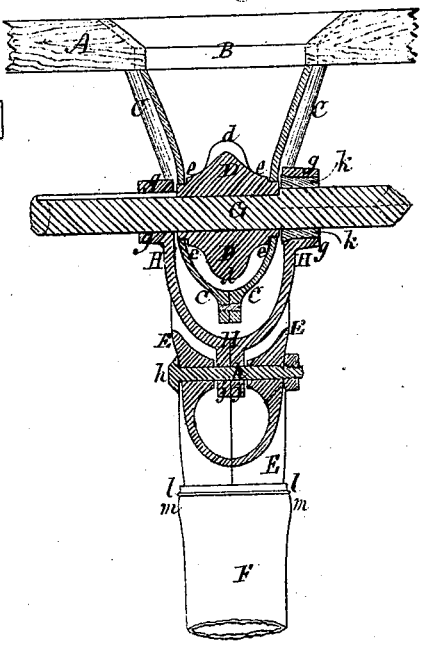
Figures 2 and 3 represent sections through the feeder and receiver, taken at right angles to each other, or nearly so.
Figure 3:
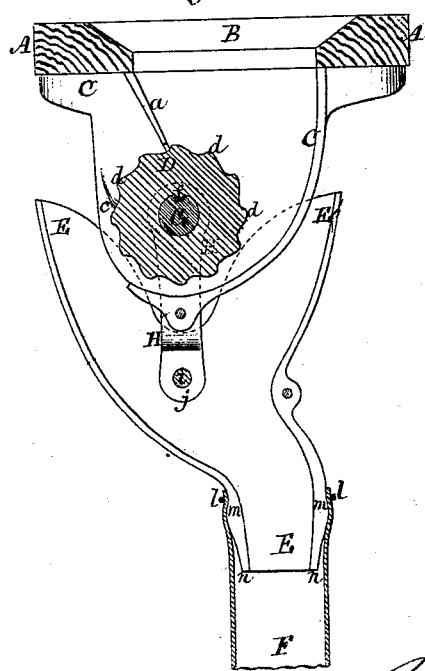
Figure 4:
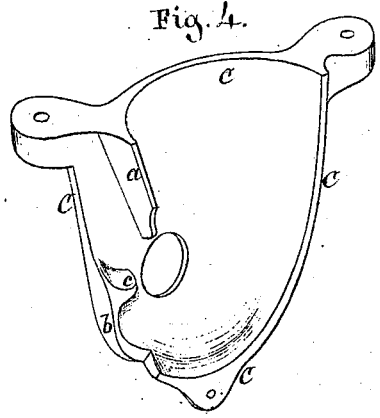
Figure 4 represents in perspective one of the sides or cheeks of the hopper in which the feed-wheel works.

The shaft G may be round, as seen to the left of fig. 1, and grooved or slotted, as at *f*, for a feather cast on the hub to take into, or for a key, by which the seed-wheels may be slipped onto said shaft and fastened to it at any proper position so as to turn with it. But I prefer to make the shaft square, as shown to the right of fig. 1, and make a square hole through the seed-wheels, which admits of their ready arrangement on the shaft, and in seed-boxes or concaves, and will just as readily turn with the shaft, as in the case of the groove, feathers, or keys, without any of the liability of the loss, breakage, or displacement of the latter devices, or any of their necessary fittings.

The receiver E is suspended underneath the concave C by a stirrup or strap, H, that is slipped onto the shaft, or the shaft passed through the lugs, eyes, or hubs *g* of said stirrups, and fastened by a pivot-bolt, *h*, or otherwise, passing through the sides of the receiver E, and through a hole, *i*, in a lug, *j*, on the bottom or under side of the stirrup H. By this mode of hinging and suspending the receiver it is free to swing or oscillate upon the shaft G as a center.

When the shaft G is made round, the lugs or hubs *g* of the stirrup H can slip over and freely swing on said shaft, while the latter is also free to turn in said hubs, and independent of the stirrup. But, as before stated, a round shaft involves the necessity of a groove and feathers, or keys, to secure the wheels to the shaft so as to turn with it, and such fastenings are liable to get out of order, get lost, or broken, and are not, therefore, desirable.

I prefer to make the shaft G square, and, that the stirrup may freely swing upon such a shaft, collars, or sleeves, *k*, with a square hole for the shaft to go through, and a circular perimeter for the lugs or hubs *g* to turn on, are used; these sleeves turn with the shaft, and in the hubs of the stirrups. The seeding-wheels would also have square holes in through them, and thus would turn with a square shaft without being specially fastened to it.

These openings need not be square, but many-sided, or of oval form, or any other form of cross-section that will admit of the wheels being readily slipped over it, and turn with it, without any of the fastening devices.

The under portion of the receiver terminates in a tube of circular form, over which the rubber or other tube F is slipped, and fastened by a wire, $l$, or otherwise, above the beaded or swiveled portion $m$; and that the rubber tube may be easily passed over the tubular end of the receiver, the latter is made tapering, as at $n$, to facilitate that purpose.

Having thus fully described my invention, and shown how the same is constructed and operated,

What I claim therein as new, and desire to secure by Letters Patent, is—

1. In combination with the circular openings B, through the bottom of the seed-box, the concave C, constructed as herein described, viz: circular at top to margin the circular hole, tapering, conical, and cup-shaped, as and for the purpose described.

2. In combination with the concave and seeding-wheel, the hub, or hubs, $e\ e$, between the ends of said wheel and the sides of the concave, substantially as represented.

3. In combination with the concave and seed-wheel turning therein, the projections $a\ b\ c$ on the concave, for the purpose of forming, in conjunction with the wheel the receiving and the distributing chambers, from which the wheel takes and delivers to the receiver the grain to be sown or drilled, and prevents all other from passing, substantially as described and represented.

4. In combination with the concave, a receiver which is pivoted to the main seed-wheel shaft by stirrups, so as to swing on said shaft as a center, substantially as described.

5. In combination with the shaft G, and the receiver suspended thereto by a stirrup, H, the sleeve $k$, united and acting therewith as and for the purpose described.

6. The receiver, terminating in a tube, which has, near its end, a swell, and below it a taper, for the purpose of receiving the India-rubber or other flexible tube, and fastening it thereto as described.

JOSEPH INGELS.

Witnesses:
DAVID G. KERN,
R. J. HUBBARD.